United States Patent
Liao et al.

(10) Patent No.: US 7,721,181 B2
(45) Date of Patent: May 18, 2010

(54) MEMORY AND 1-BIT ERROR CHECKING METHOD THEREOF

(75) Inventors: Chun-Yu Liao, Taichung (TW); Shih-Chang Huang, Penghu County (TW)

(73) Assignee: Macronix International Co., Ltd., Hsinchu (TW)

( * ) Notice: Subject to any disclaimer, the term of this patent is extended or adjusted under 35 U.S.C. 154(b) by 335 days.

(21) Appl. No.: 11/776,027

(22) Filed: Jul. 11, 2007

(65) Prior Publication Data

US 2009/0019336 A1    Jan. 15, 2009

(51) Int. Cl.
*H03M 13/00* (2006.01)
(52) U.S. Cl. .................. 714/758; 714/763; 714/776
(58) Field of Classification Search .............. 714/758, 714/763, 776
See application file for complete search history.

(56) References Cited

U.S. PATENT DOCUMENTS

| | | | | |
|---|---|---|---|---|
| 5,490,155 | A | * | 2/1996 | Abdoo et al. ............... 714/763 |
| 6,519,735 | B1 | * | 2/2003 | Holman et al. ............. 714/763 |
| 6,987,684 | B1 | * | 1/2006 | Branth et al. ............ 365/49.17 |
| 7,096,406 | B2 | * | 8/2006 | Kanazawa et al. ......... 714/763 |

* cited by examiner

*Primary Examiner*—Esaw T Abraham
(74) *Attorney, Agent, or Firm*—Thomas, Kayden, Horstemeyer & Risley

(57) ABSTRACT

A memory 1-bit error checking method is provided. Firstly, at least one piece of data fragment whose side is $2^n$ bits is received. Next, an error correction code, a parity code and a data code are generated and written in the memory. Then, the at least one piece of data fragment is read from the memory and used as at least one piece of read data fragment. Next, a new error correction code, a new parity code and a new data code are generated. Afterwards, a determination as to whether the at least one piece of read data fragment has a 1-bit error is made. After that, if the at least one piece of read data fragment does not have a 1-bit error, then the at least one piece of read data fragment is outputted.

11 Claims, 4 Drawing Sheets

MEMORY AND 1-BIT ERROR CHECKING METHOD THEREOF

BACKGROUND OF THE INVENTION

1. Field of the Invention

The invention relates in general to a memory and a 1-bit error checking method thereof, and more particularly to a memory simplifying hardware configuration and saving memory space, and a 1-bit error checking method thereof.

2. Description of the Related Art

Memory device has now been widely used in the storage of data. The completeness of data storage is essential in the design of memory. Conventionally, the above data completeness is achieved via the use of an error correction code (ECC). The error correction code is used in a data completeness checking method for detecting and correcting a 1-bit error.

Referring to FIG. 1A, a flowchart of a conventional memory 1-bit error checking method is shown. Firstly, the method begins at step 100, at least one piece of data fragment whose size is $2^n$ bits is received, wherein n is an integer greater than or equal to 0. Next, the method proceeds to step 110, an error correction code whose size is 2n bits is generated according to the at least one piece of data fragment, wherein the error correction code is generated according to an error checking and correction algorithm (ECC algorithm). In order to avoid a 1-bit error occurring to the error correction code, the error correction code further includes an error checking and correction (ECC) parity bit and its complement. The error correction code is an overhead bit for the at least one piece of data fragment.

Then, the method proceeds to step 120, the at least one piece of data fragment and the error correction code are written in the memory. After that, the method proceeds to step 130, the at least one piece of data fragment is read from the memory and used as at least one piece of read data fragment. Next, the method proceeds to step 140, a new error correction code is generated according to the at least one piece of read data fragment by using the ECC algorithm. Then, the method proceeds to step 150, a determination as to whether the at least one piece of read data fragment is the same with the at least one piece of data fragment is made according to the error correction code and the new error correction code. Substantially, in step 150, according to the error checking and correction algorithm, an "exclusive or" operation is performed on the error correction code and the new error correction code, and if the result is 0, the at least one piece of read data fragment is determined to be the same with the at least one piece of data fragment.

If the at least one piece of read data fragment is the same with the at least one piece of data fragment, then the method proceeds to step 160, the memory determines that the read operation is correct and outputs the at least one piece of read data fragment. If the at least one piece of read data fragment is different from the at least one piece of data fragment, then the method proceeds to step 170, if the memory determines that the read operation has a 1-bit error, then the memory corrects the at least one piece of read data fragment as the at least one piece of data fragment according to the new error correction code and outputs the at least one piece of read data fragment.

Referring to FIG. 1B, a schematic diagram of the error checking and correction algorithm is shown. As shown in FIG. 1B, at least one piece of data fragment whose size is 8 bits (D0~D7) is exemplified. The 6-bit error correction code of the at least one piece of data fragment is generated according to the ECC algorithm. The error correction code includes ECC parity bits P1, P2 and P4, and the complements P1', P2' and P4'. Likewise, the new error correction code also does. The equations of ECC parity bits P1, P2 and P4, and the complements P1', P2' and P4' are described as below, wherein $\oplus$ means "exclusive or".

$$P4 = D7 \oplus D6 \oplus D5 \oplus D4 \quad (eq.\ 1)$$

$$P2 = D7 \oplus D6 \oplus D3 \oplus D2 \quad (eq.\ 2)$$

$$P1 = D7 \oplus D5 \oplus D3 \oplus D1 \quad (eq.\ 3)$$

$$P4' = D3 \oplus D2 \oplus D1 \oplus D0 \quad (eq.\ 4)$$

$$P2' = D5 \oplus D4 \oplus D1 \oplus D0 \quad (eq.\ 5)$$

$$P1' = D6 \oplus D4 \oplus D2 \oplus D0 \quad (eq.\ 6)$$

In step 170, if the memory determines that the read operation has a 1-bit error, that means the result of the "exclusive or" operation performed on the error correction code and the new error correction code is not all 0. The "exclusive or" result is the error location of the at least one piece of read data fragment. Then invert the error bit and the error is corrected.

According to the conventional memory error checking method, despite the ECC algorithm is able to detect and correct a 1-bit error. However, in checking the 1-bit error of a memory, the size of the error correction code is 2n bits, not only make the overhead bit to occupy too much memory space, but also make it difficult to simplify the hardware configuration of the memory.

SUMMARY OF THE INVENTION

The invention is directed to a memory and a 1-bit error checking method thereof. By using a simpler 1-bit error checking method, the memory is enabled to have a simple hardware configuration, hence saving memory space considerably.

According to a first aspect of the present invention, a memory 1-bit error checking method is provided. Firstly, at least one piece of data fragment whose side is $2^n$ bits is received. Next, an error correction code, a parity code and a data code are generated according to the at least one piece of data fragment and written in the memory. Then, the at least one piece of data fragment is read from the memory and used as at least one piece of read data fragment. Next, a new error correction code, a new parity code and a new data code are generated according to the at least one piece of read data fragment. Afterwards, a determination as to whether the at least one piece of read data fragment has a 1-bit error corresponding to the at least one piece of data fragment is made according to the error correction code and the new error correction code, the parity code and the new parity code, and the data code and the new data code. After that, if the at least one piece of read data fragment does not have a 1-bit error, then the at least one piece of read data fragment is outputted.

According to a second aspect of the present invention, a memory including a memory array and an error correction circuit is provided. The memory array receives and stores at least one piece of data fragment. The at least one piece of data fragment is read from the memory array and used as at least one piece of read data fragment, wherein the size of both the at least one piece of data fragment and the at least one piece of read data fragment is $2^n$ bits, n is an integer greater than or equal to 0. An error correction code, a parity code and a data code are generated by the error correction circuit according to the at least one piece of data fragment, wherein the data code corresponds to the error correction code. Furthermore, a new error correction code, a new parity code and a new data code are generated according to the at least one piece of read data fragment, wherein the new data code corresponds to the new error correction code. A determination as to whether the at least one piece of read data fragment has a 1-bit error corresponding to the at least one piece of data fragment is made by the memory according to the error correction code and the new error correction code, the parity code and the new parity code, and the data code and the new data code.

The invention will become apparent from the following detailed description of the preferred but non-limiting embodiments. The following description is made with reference to the accompanying drawings.

DETAILED DESCRIPTION OF THE INVENTION

The invention provides a memory and a 1-bit error checking method thereof. The 1-bit error checking method checks whether a 1-bit error occurs to the data stored in the memory according to an error correction code having either an error checking and correction (ECC) parity bit or its compliment, and a 1-bit parity code and a 1-bit data code in a simpler way, so that the memory has a simple hardware configuration and saves memory space.

Figure 1A:
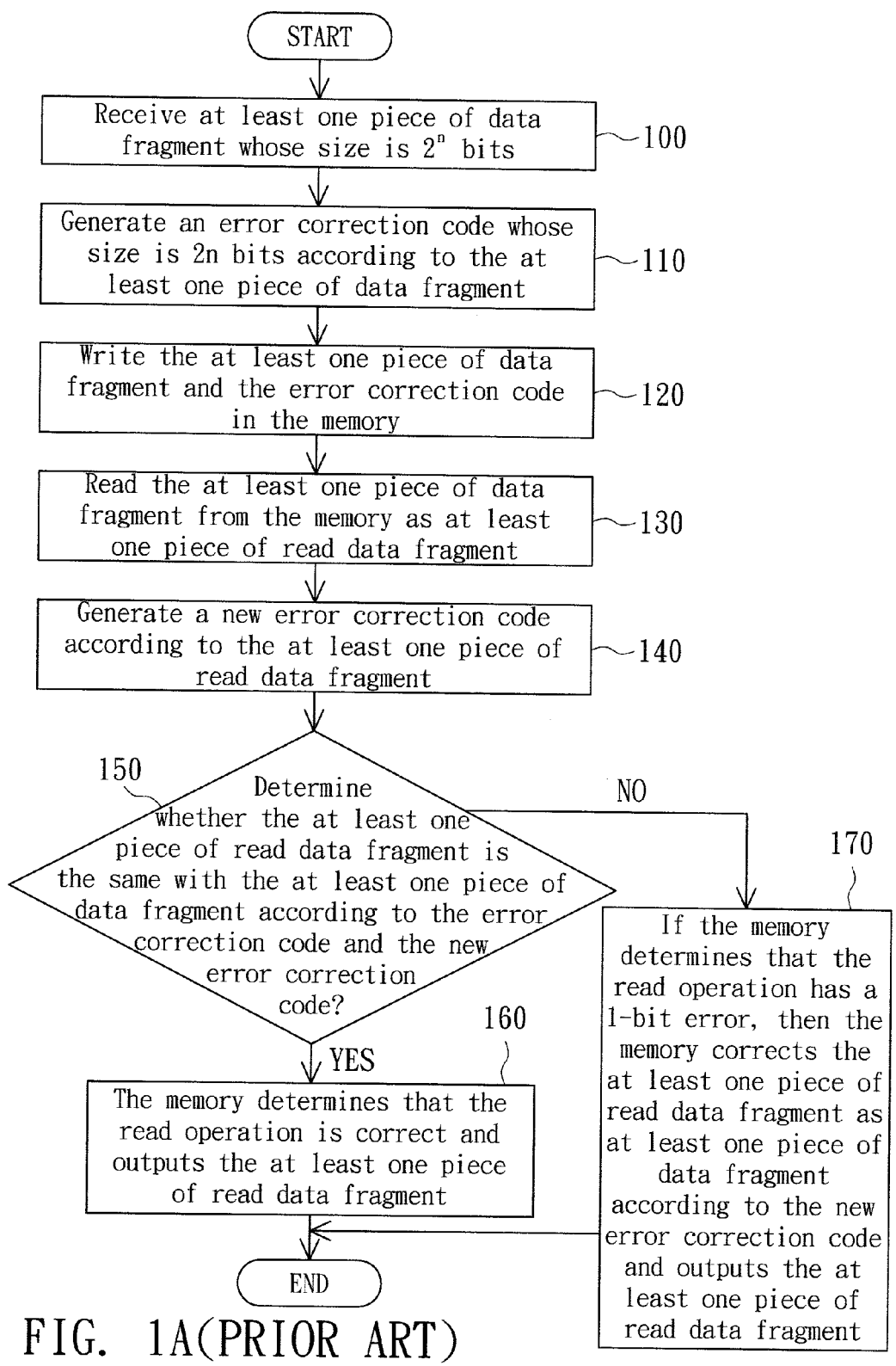
FIG. 1A (Prior Art) is a flowchart of a conventional memory 1-bit error checking method.
Figure 1B:
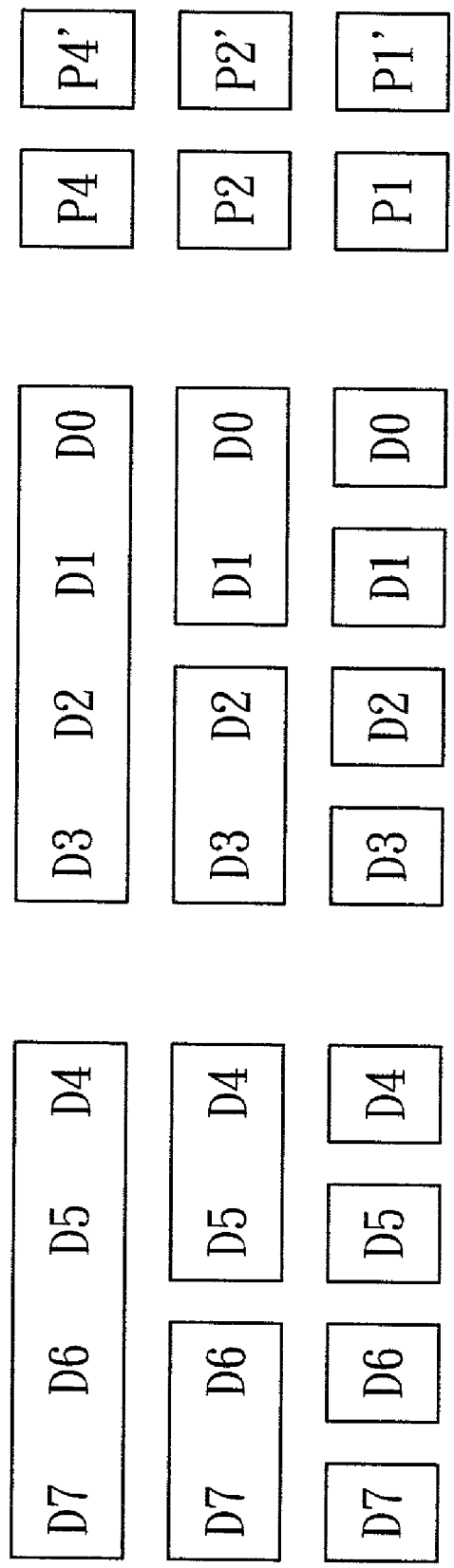
FIG. 1B (Prior Art) is a schematic diagram of the error checking and correction algorithm.
Figure 2:
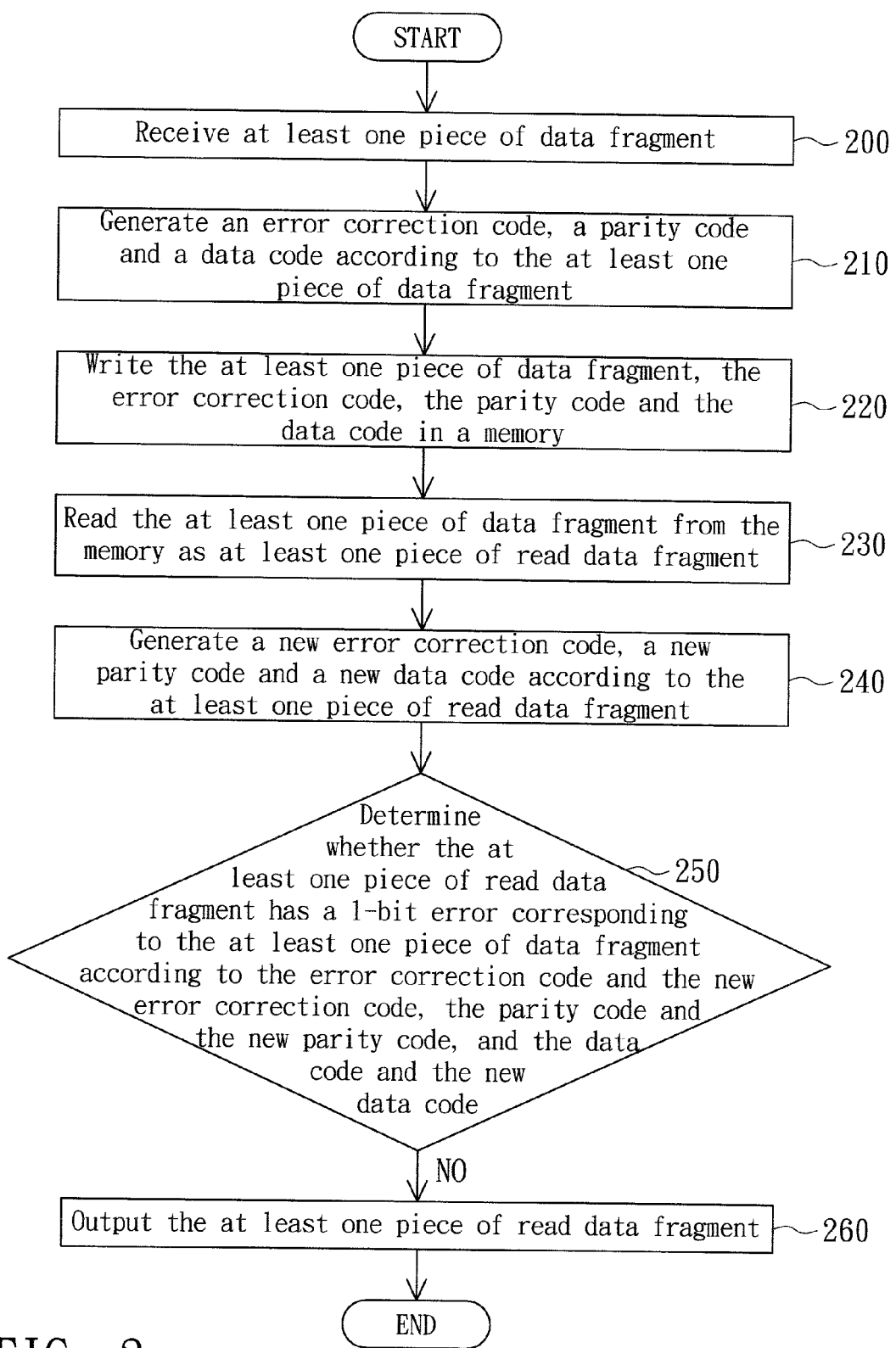
FIG. 2 is a flowchart of a memory 1-bit error checking method according to a preferred embodiment of the invention.

Referring to FIG. 2, a flowchart of a memory 1-bit error checking method according to a preferred embodiment of the invention is shown. The memory 1-bit error checking method is used in a memory. Firstly, the method begins at step 200, at least one piece of data fragment whose size is $2^n$ bits is received, wherein n is an integer greater than or equal to 0. Then, the method proceeds to step 210, an error correction code, a parity code and a data code are generated according to the at least one piece of data fragment, wherein the data code corresponds to the error correction code. The error correction code whose size is n bits is generated according to an error checking and correction algorithm (ECC algorithm) and is either an ECC parity bit or its compliment. Take the at least one piece of data fragment whose size is 8 bits (D0~D7) as exemplified hereinafter. The equations of ECC parity bits E1, E2 and E4, and the complements E1', E2' and E4' are described as below, wherein $\oplus$ means "exclusive or".

$$E4 = D7 \oplus D6 \oplus D5 \oplus D4 \quad \text{(eq. 7)}$$

$$E2 = D7 \oplus D6 \oplus D3 \oplus D2 \quad \text{(eq. 8)}$$

$$E1 = D7 \oplus D5 \oplus D3 \oplus D1 \quad \text{(eq. 9)}$$

$$E4' = D3 \oplus D2 \oplus D1 \oplus D0 \quad \text{(eq. 10)}$$

$$E2' = D5 \oplus D4 \oplus D1 \oplus D0 \quad \text{(eq. 11)}$$

$$E1' = D6 \oplus D4 \oplus D2 \oplus D0 \quad \text{(eq. 12)}$$

The parity code is generated by performing an "exclusive or" operation on all bits of the at least one piece of data fragment. That is, the parity code equals 0 if the at least one piece of data fragment has an even number of 1, and the parity code equals 1 if the at least one piece of data fragment has an odd number of 1. The equation of the parity code P or P' is described as below.

$$P \text{ or } P' = D7 \oplus D6 \oplus D5 \oplus D4 \oplus D3 \oplus D2 \oplus D1 \oplus D0 \quad \text{(eq. 13)}$$

Besides, the data code corresponding to the error correction code is used to assure the completeness of the memory 1-bit error checking method. When the error correction code is an ECC parity bit, the data code is the lowest bit among the at least one piece of data fragment; and when the error correction code is a complement to the ECC parity bit, the data code is the highest bit among the at least one piece of data fragment. The equation of the data code D or D' is described as below.

$$D = D0 \quad \text{(eq. 14)}$$

$$D' = D7 \quad \text{(eq. 15)}$$

Then, the method proceeds to step 220, the at least one piece of data fragment, the error correction code, and the parity code and the data code are written in a memory. The error correction code, the parity code and the data code are used as an overhead bit of the at least one piece of data fragment and written in the memory. Then, the method proceeds to step 230, the at least one piece of data fragment is read from the memory and used as at least one piece of read data fragment, wherein the size of the at least one piece of read data fragment is $2^n$ bits.

Afterwards, the method proceeds to step 240, a new error correction code, a new parity code, and a new data code are generated according to the at least one piece of read data fragment, wherein the new data code corresponds to the new error correction code. A new error correction code whose size is n bits is generated according to an error checking and correction algorithm. When the error correction code is an ECC parity bit, the new error correction code is also an ECC parity bit; and when the error correction code is a complement to the ECC parity bit, the new error correction code is also a complement to the ECC parity bit. The new parity code is generated by performing an "exclusive or" operation on all bits of the at least one piece of read data fragment. Besides, when the new error correction code is an ECC parity bit, the new data code is the lowest bit among the at least one piece of read data fragment; and when the new error correction code is a complement to the ECC parity bit, the data code is the highest bit among the at least one piece of read data fragment.

After that, the method proceeds to step 250, a determination as to whether the at least one piece of read data fragment has a 1-bit error corresponding to the at least one piece of data fragment is made according to the error correction code and the new error correction code, the parity code and the new parity code, and the data code and the new data code. After that, the method proceeds to step 260, the at least one piece of read data fragment is outputted if the at least one piece of read data fragment does not have a 1-bit error corresponding to the at least one piece of data fragment.

In step 250, the determination as to whether at least one piece of read data fragment has a 1-bit error is made by performing an "exclusive or" operation on the error correction code and the new error correction code, the parity code and the new parity code, and the data code and the new data code, respectively. Referring to Table One, an inquiry table for the memory 1-bit error checking method according to the invention preferred embodiment is shown.

TABLE ONE

| E | P | D |
|---|---|---|
| 0 | 0 | X |
| 0 | 1 | 0 |
| 0 | 1 | 1 |
| 1 | 0 | X |
| 1 | 1 | X |

In Table One, "E" denotes the result after the "exclusive or" operation is performed on the error correction code and the new error correction code; "P" denotes the result after the "exclusive or" operation is performed on the parity code and the new parity code; "D" denotes the result after the "exclusive or" operation is performed on the data code and the new data code; "X" denotes "don't care", "1" denotes that at least one piece of read data fragment has a 1-bit error; and "0" denotes that at least one piece of read data fragment does not have a 1-bit error.

When (E, P, D) equals (0, 0, X), this implies that the at least one piece of read data fragment is determined not to have a 1-bit error both according to the error correction code and the new error correction code and according to the parity code and the new parity code, so that the at least one piece of read data fragment is the same with the at least one piece of data fragment. Meanwhile, if D is denoted by 1, this implies that an error occurs to the data code and the new data code.

When (E, P) equals (0, 1), this implies that the at least one piece of read data fragment is determined not to have a 1-bit error according to the error correction code and the new error correction code but is determined to have a 1-bit error according to the parity code and the new parity code. Meanwhile, the data code and the new data code are checked for further determination. When (E, P, D) equals (0, 1, 1), this implies that the at least one piece of read data fragment is determined to have a 1-bit error according to the data code and the new data code, so that the 1-bit error is corrected. The 1-bit error occurs to the bit that the data code and the new data code correspond to. When (E, P, D) equals (0, 1, 0), this implies that the at least one piece of read data fragment is determined not to have a 1-bit error according to the data code and the new data code. That is, an error occurs to the parity code and the new parity code.

When (E, P, D) equals (1, 0, X), this implies that the at least one piece of read data fragment is determined to have a 1-bit error according to the error correction code and the new error correction code but is determined not to have a 1-bit error according to the parity code and the new parity code. Under such circumstances, an error occurs to the error correction code and the new error correction code, and the at least one piece of read data fragment does not have a 1-bit error corresponding to the at least one piece of data fragment.

When (E, P, D) equals (1, 1, X), this implies that the at least one piece of read data fragment is determined to have a 1-bit error both according to the error correction code and the new error correction code and according to the parity code and the new parity code. Under such circumstances, the at least one piece of read data fragment has a 1-bit error, and the 1-bit error occurring to the at least one piece of read data fragment is corrected according to the error correction code and the new error correction code according to the error checking and correction (ECC) algorithm.

Take the at least one piece of data fragment be (00101011) and the at least one piece of read data fragment be (00101010) for example. According to the above memory 1-bit error checking method, the at least one piece of data fragment has an error correction code (P4 P2 P1)=(111), a parity code 0 and a data code 1. The at least one piece of read data fragment has a new error correction code (P4 P2 P1)=(111), a new parity code 1 and a new data code 0. Hence (E, P, D) that equals (0, 1, 1) is obtained. That means the lowest bit among the at least one piece of read data fragment has a 1-bit error. Then the at least one piece of read data fragment is corrected to (00101011).

Figure 3:
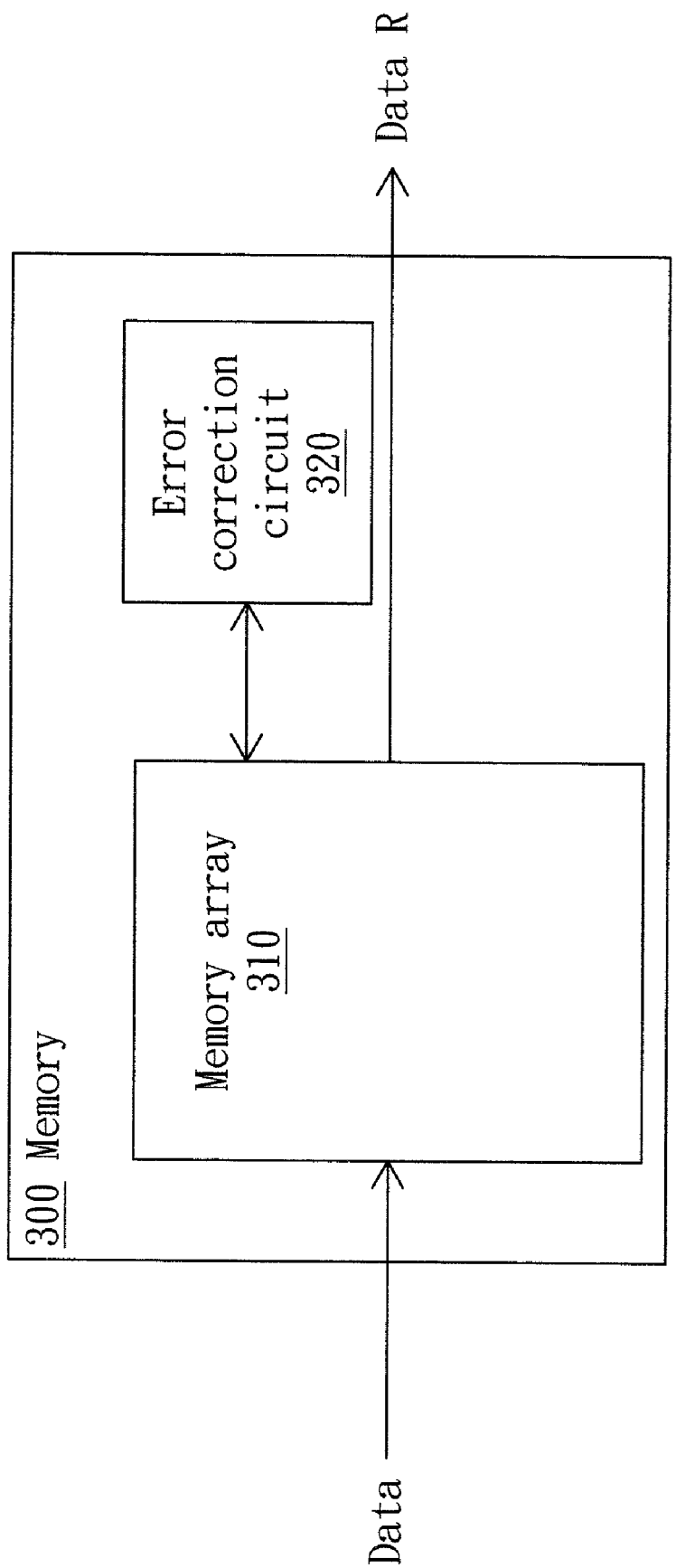
FIG. 3 is a block diagram of a memory according to a preferred embodiment of the invention.

Referring to FIG. 3, a block diagram of a memory according to a preferred embodiment of the invention is shown. The memory 300 includes a memory array 310 and an error correction circuit 320. The memory array 310 receives and stores at least one piece of data fragment Data. The memory 300 reads at least one piece of data fragment Data from the memory array 310 and uses the at least one piece of data fragment Data as at least one piece of read data fragment DataR. The size of both the at least one piece of data fragment Data and the at least one piece of read data fragment DataR is $2^n$ bits, wherein n is an integer greater than or equal to 0.

The error correction circuit 320 generates an error correction code, a parity cod, and a data code according to the at least one piece of data fragment Data, and generates a new error correction code, a new parity code and a new data code according to the at least one piece of read data fragment DataR, wherein the data code corresponds to the error correction code, and the new data code corresponds to the new error correction code.

Both the error correction code and the new error correction code are an ECC parity bit or its compliment. The size of both the error correction code and the new error correction code is n bits. The size of both the parity code and the new parity code is 1 bit. The size of both the data code and the new data code is 1 bit. When the error correction code and the new error correction code are an ECC parity bit, the data code is the lowest bit among the at least one piece of data fragment, and the new data code is the lowest bit among the at least one piece of read data fragment. When the error correction code and the new error correction code are a complement to the ECC parity bit, the data code is the highest bit among the at least one piece of data fragment, and the new data code is the highest bit among the at least one piece of read data fragment.

The memory 300 determines whether the at least one piece of read data fragment has a 1-bit error corresponding to the at least one piece of data fragment according to the error correction code and the new error correction code, the parity code and the new parity code, and the data code and the new data code. Besides, the 1-bit error checking method used in the memory 300 is already disclosed in the memory 1-bit error checking method in the above embodiments of the invention, and is not repeated here.

The memory and the 1-bit error checking method thereof disclosed in the above embodiments of the invention check whether a 1-bit error occurs to the data stored in the memory according to an error correction code having either an error checking and correction (ECC) parity bit or its compliment, a 1-bit parity code, and a 1-bit data code in a simpler way. Compared with the conventional memory 1-bit error checking method in which the at least one piece of data fragment whose size is $2^n$ bits uses 2n bits of overhead bits, the memory 1-bit error checking method disclosed in the invention only uses (n+2) bits of overhead bits, largely saving the memory space, and simplifying the hardware configuration for the memory.

Besides, the data completeness is also achieved via the use of a Hamming code conventionally. Several check bits are added to the specific positions of the at least one piece of data fragment. For example, when the size of the at least one piece of data fragment is n bits, then k check bits are added to the $2^0$, $2^1$, $2^2$, ... and $2^{k-1}$ bit following the equation 7 described below, wherein k is an integer.

$$2^k \geqq =n+k+1 \qquad \text{(eq. 7)}$$

The number of 1 that the check bit and the bits corresponding to the check bit have must be even. The check bits are used for detecting and correcting a 1-bit error of the at least one piece of data fragment. However, all the memory bits are adjacent in the memory. The Hamming code has to add some check bits to the specific positions of the at least one piece of data fragment. Hence the Hamming code is not suitable for applying to the memory.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A 1-bit error correction method performed on data in a memory, comprising:
   receiving at least one piece of data fragment, wherein the size of the data fragment is $2^n$ bits, n is an integer greater than or equal to 0;
   generating an error correction code, a parity code and a data code according to the data fragment;
   writing the data fragment, the error correction code, the parity code and the data code in a memory;
   reading the data fragment from the memory as a read data fragment, wherein the size of the read data fragment is $2^n$ bits;
   generating a new error correction code, a new parity code and a new data code according to the read data fragment;
   determining whether the read data fragment has a 1-bit error corresponding to the data fragment by comparing the error correction code and the new error correction code, the parity code and the new parity code, and the data code and the new data code, respectively; and
   correcting the 1-bit error according to the error correction code and the new error correction code, and the data code and the new data code if the read data fragment has the 1-bit error.

2. The 1-bit error correction method according to claim 1, wherein when both the error correction code and the new error correction code are an error checking and correction (ECC) parity bit, the data code is the lowest bit among the data fragment, and the new data code is the lowest bit among the read data fragment.

3. The 1-bit error correction method according to claim 1, wherein when both the error correction code and the new error correction code are a complement to the ECC parity bit, the data code is the highest bit among the data fragment, and the new data code is the highest bit among the read data fragment.

4. The 1-bit error correction method according to claim 1, wherein the step of determining whether the read data fragment has a 1-bit error further comprises:
   correcting the 1-bit error according to the error correction code and the new error correction code if the read data fragment is determined to have a 1-bit error according to the error correction code and the new error correction code and if the read data fragment is determined to have a 1-bit error according to the parity code and the new parity code.

5. The 1-bit error correction method according to claim 1, wherein the step of determining whether the read data fragment has a 1-bit error corresponding to the data fragment further comprises:
   determining that the read data fragment does not have a 1-bit error corresponding to the data fragment if error occurs to the error correction code and the new error correction code when the read data fragment is determined to have a 1-bit error according to the error correction code and the new error correction code but is determined not to have a 1-bit error according to the parity code and the new parity code.

6. The 1-bit error correction method according to claim 1, wherein the step of determining whether the read data fragment has a 1-bit error corresponding to the data fragment further comprises:
   checking the data code and the new data code if the read data fragment is determined not to have a 1-bit error according to the error correction code and the new error correction code but is determined to have a 1-bit error according to the parity code and the new parity code; and
   correcting the 1-bit error if the read data fragment is determined to have a 1-bit error according to the data code and the new data code.

7. The 1-bit error correction method according to claim 1, wherein the step of determining whether the read data fragment has a 1-bit error corresponding to the data fragment further comprises:
   determining that the read data fragment does not have a 1-bit error corresponding to the data fragment if error occurs to the parity code and the new parity code when the read data fragment is determined not to have a 1-bit error both according to the error correction code and the new error correction code and according to the data code and the new data code, but is determined to have a 1-bit error according to the parity code and the new parity code.

8. The 1-bit error correction method according to claim 1, wherein the step of determining whether the read data fragment has a 1-bit error corresponding to the data fragment further comprises:
   determining that the read data fragment does not have a 1-bit error corresponding to the data fragment if error occurs to the data code and the new data code when the read data fragment is determined not to have a 1-bit error both according to the error correction code and the new error correction code and according to the parity code and the new parity code but is determined to have a 1-bit error according to the data code and the new data code.

9. A memory, comprising:
   a memory array used for receiving and storing at least one piece of data fragment, wherein the memory reads the data fragment from the memory array as a read data fragment, and the size of both the data fragment and the read data fragment is $2^n$ bits, n is an integer greater than or equal to 0; and
   an error correction circuit for generating an error correction code, a parity code and a data code according to the data fragment, wherein a new error correction code, a new parity code and a new data code are generated according to the read data fragment;
   wherein the memory determines whether the read data fragment has a 1-bit error corresponding to the data fragment by comparing the error correction code and the new error correction code, the parity code and the new parity code, and the data code and the new data code, respectively.

10. The memory according to claim 9, wherein when both the error correction code and the new error correction code are an ECC parity bit, the data code is the lowest bit among the data fragment, and the new data code is the lowest bit among the read data fragment.

11. The memory according to claim 9, wherein when both the error correction code and the new error correction code are a complement to the ECC parity bit, the data code is the highest bit among the data fragment, and the new data code is the highest bit among the read data fragment.

* * * * *